US 6,546,153 B1

(12) United States Patent
Hoydal

(10) Patent No.: US 6,546,153 B1
(45) Date of Patent: Apr. 8, 2003

(54) METHOD FOR IMAGE PROCESSING

(75) Inventor: Finn Hoydal, Oslo (NO)

(73) Assignee: Dimensions AS, Elverum (NO)

( * ) Notice: Subject to any disclaimer, the term of this patent is extended or adjusted under 35 U.S.C. 154(b) by 0 days.

(21) Appl. No.: 09/423,191

(22) PCT Filed: May 6, 1998

(86) PCT No.: PCT/NO98/00141

§ 371 (c)(1),
(2), (4) Date: Mar. 20, 2000

(87) PCT Pub. No.: WO98/50889

PCT Pub. Date: Nov. 12, 1998

(30) Foreign Application Priority Data

May 6, 1997 (NO) .............................................. 9720/97

(51) Int. Cl.$^7$ ................................................. G06K 9/36
(52) U.S. Cl. ...................................... 382/285; 382/276
(58) Field of Search ................................ 382/285, 154, 382/276, 286; 702/157, 150; 348/47, 578, 580

(56) References Cited

U.S. PATENT DOCUMENTS 6,014,472 A * 1/2000 Minani et al. ............... 382/285
6,023,523 A * 2/2000 Cohen et al. ................ 382/154
6,236,748 B1 * 5/2001 Iijima et al. ................ 382/154

FOREIGN PATENT DOCUMENTS

WO         WO 97/09830         3/1997

* cited by examiner

Primary Examiner—Yon J. Couso
(74) Attorney, Agent, or Firm—Birch, Stewart, Kolasch & Birch, LLP

(57) ABSTRACT

A method for image processing, especially for converting a two-dimensional image of a three-dimensional real subject into a three-dimensional representation of the same three-dimensional real subject, wherein the subject is composed of elements, each of which is represented by a pixel in the two-dimensional image. The image's colors are subjected to an analysis with regard to color quality, and the individual color points' orientation in space is localised by utilizing a color temperature scale, a color saturation scale and a contrast scale, with the result that each color obtains its perspective place relative to the image's other colors.

7 Claims, 3 Drawing Sheets

METHOD FOR IMAGE PROCESSING

The invention concerns a method for image processing, especially for converting a two-dimensional image of a three-dimensional real subject into a three-dimensional representation of the same three-dimensional real subject, wherein the subject is composed of elements in the two-dimensional image.

The object of the present invention is to provide a new and simple technique which enables colour pictures to be converted from film or video, which is a two-dimensional representation in the image plane with width and height co-ordinates (x, y), into a three-dimensional representation in space with width, height and depth co-ordinates (X, Y, Z). Such a three-dimensional representation may, for example, be used for analysing form elements in the image surface (object diagnostics) or for the production of three-dimensional images/film for a medium suited thereto.

Colour pictures from film or video are a photographic representation of light from one or more light sources with a certain spectral composition which at a given point of time struck objects in the camera's image representation. All objects absorb certain colours and reflect the rest. The object colour is determined by the spectral distribution of the light reflected by the object. The recording on film of an object is dependent on several elements, including:

1) The spectral distribution of the light source(s).
2) The spectral reflecting power of the object.
3) The distance from the camera and absorption spectrum of this air perspective.
4) The photographic material's colour recording ability.

In order to obtain space co-ordinates, including the depth parameter Z, for subject elements in an existing image, the image's colour is analysed. The colour is a recording of incident light sources and reflecting objects.

The colour of light sources is measured in colour temperature and is indicated in Kelvin (K). When photographing a scenario the colour temperature of the incident and reflected light from objects in the image surface will normally be measured with a colour light meter, using film with a colour recording ability which is adapted for the purpose (daylight, artificial light, etc.). The colour temperature of light sources varies with the distance to the camera.

The individual image elements in a colour picture represent the reflecting objects in the image representation. The colour of the image elements is unambiguously determined by three measurable parameters: hue, saturation and brightness. These colour parameters vary with the distance to the camera.

The hue refers to the colour's place in the electromagnetic spectrum, cf. Newton's colour spectrum and circle. This is normally indicated by the relative composition of the spectral colours Red, Green and Blue (R, G, B), or alternatively Magenta, Yellow and Cyan (M, Y, C). Cf. also transformation to colour co-ordinates according to the CIE 1931 standard, where all visible colours (i.e. in the wavelength range from 400 nm to 770 nm) for a given degree of brightness can be assigned exact co-ordinates within a diagram which is defined by the spectral colours and a purple line.

The saturation indicates how much a colour has been mixed with other colours, and is designated as a percentage (%). A pure spectral colour is called saturated (degree of saturation 100%), white and grey are called unsaturated colours (degree of saturation 0%).

The brightness (light intensity) is a measure of the incident amount of light relative to reflection from an absolutely white surface (100% reflecting) and is designated thereby as a relative percentage (%).

The recorded colour of light reflected from objects which are moving at different distances relative to a film camera varies. The colour temperature of light sources varies with the distance. The individual element's hue (RGB) is constant, but brightness and saturation vary with the distance. A high degree of brightness, saturated colours and low colour temperature occur close to the image surface (short distance), giving so-called active levels. Correspondingly, a low degree of brightness, unsaturated colours and high colour temperature will occur far from the image surface (long distance), giving passive levels. In addition this works internally in all these levels (active/passive), where warm colours appear more active in complementary contrast to cold colours. Warm colours are M, MY and Y. Cold colours are YC and C.

Due to the variation in the said characteristics with distance from a film camera, it may be deduced that each colour has its own perspective place in one and the same scenario in relation to the image's other colours. This is the basis of the present invention.

According to the invention a method is proposed for image processing, especially for converting a two-dimensional image of a three-dimensional real subject into a three-dimensional representation of the same three-dimensional real subject, wherein the subject is composed of elements in the two-dimensional image, and wherein the two-dimensional image is provided by means of a camera. The method is characterized by:

defining a reference plane corresponding to the camera's focal plane lying closest to the camera's focal plane, the reference plane comprising elements corresponding to elements in the two-dimensional image, defining colour parameters hue, saturation, brightness for each element in the reference plane, creating a reference scale by determining values of the colour parameters by means of an image sequence of individual images, each of which depicts the subject in different predetermined focal planes, the changes in colour parameters between the respective focal planes being used for calibration of a geometric measuring scale which refers respective measured colour parameters to metric or perspective distance values, measuring and registering colour parameters hue, saturation and brightness for each element in the two-dimensional image, comparing colour parameters for each element in the two-dimensional picture with colour parameters for the corresponding element in the reference plane, based on said comparison, assigning to each element in the two-dimensional image a distance value dh;ds;db, where dh results from comparing hue values, ds results from comparing saturation values and db results from comparing brightness values, calculating the distance d(z) between the elements in the two-dimensional image and the reference plane, d(z) being the distance measured along a z-axis perpendicular to the reference plane and with origin therein, as a weighed average of the distance values dh,ds,db; $d(z) = \frac{1}{3}*(kh*dh+ks*ds+kb*db)$, where kh, ks and kb constitute weight factors based on empirical data, performing the transformations $d(x) \rightarrow X$, $d(y) \rightarrow Y$ and $d(z) \rightarrow Z$, where X,Y,Z are the element's co-ordinates in a three-dimensional co-ordinate system with origin in the reference plane, the transformations $d(x) \rightarrow X$, $d(y)$ →Y being obtained by means of a known procedure for converting image elements in the plane into elements in space by means of calculated ratios (scale) between the camera's image plane and the focal planes in the space, the closest plane constituting the reference plane, and the transformation d(z)→Z being obtained by reverse application of the procedure for frontal perspective construction for reading metric distance from a standardised perspective drawing, and determining on the basis of the established distance value d(z) and the element's x,y co-ordinates in the two-dimensional image plane real spatial co-ordinates X,Y,Z for the element.

The invention comprises the creation of a reference scale by determining values of the parameters for colour by means of an image sequence of individual images, each of which depicts the subject in different predetermined focal planes, the changes in the colour parameters between the respective focal planes being used for calibration of a geometrical measuring scale which refers the respective measured colour parameters to metric or perspective distance values. The geometrical measuring scale preferably comprises geometrically coincident non-linear scales based on reference and empirical data for hue, colour saturation and brightness respectively. The colour temperature increases towards its maximum value at the common end point or point of convergence where the colour saturation and the contrast approach zero. The non-linear scales' common point of convergence is determined by means of the colour parameters for one or more remotely located elements in the image which was focused on the focal plane for furthest distance, the measured values for this element or average measured values for these elements determining the point of convergence. In a further preferred embodiment the geometrical measuring scale is inserted in a frontal perspective diagram corresponding to the format of the two-dimensional image and with the non-linear scales calibrated for the colour of the image concerned in order to determine the distance between the reference plane and an element in the image.

Finally, according to the invention use is preferably made of either a perspective-based distance value or a metric distance value.

By this means exposed colour photographic image material is subjected to an analysis based on empirical and experimental knowledge of characteristics of colour, each colour thereby obtaining its perspective place relative to the image's other colours. As a result the invention provides a three-dimensional reference database for all colours in the scenario, from which other perspective parameters such as distance, spatial co-ordinates etc. may be deduced.

In the present invention information is processed which exists in already exposed photographic colour pictures. If the photographic material is of the traditional analogue type, such as negative or positive colour film/paper or video, for further treatment it will be natural to convert the material to digital format, where each point in the image surface is represented by a pixel, i.e. a description of its characteristics, and which should contain amongst other things the point's orientation in the image plane and the desirable data with regard to colour (hue, saturation and brightness). Such a digital representation can be provided by means of existing editing units for image processing, in which the invention may also be processed.

In the following description of the present invention a mathematical model is employed based on a geometrical method. The object of this embodiment is to provide the best possible explanation of the method. In practice it will be natural to implement the method in an alternative equivalent mathematical method for processing in a computer.

The invention will now be described in more detail with reference to the attached figures which illustrate the method, in which.

Figure 1:
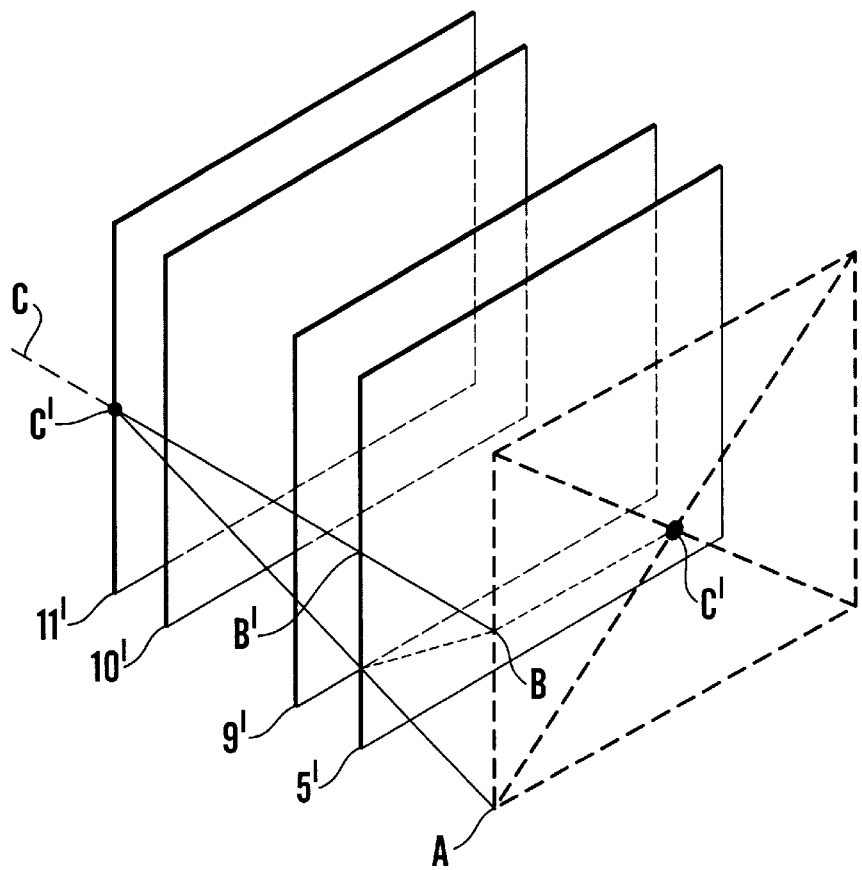
FIG. 1 is a schematic illustration of several images of a moving object, employed for deduction of calibration or reference data.

FIG. 1 illustrates an image sequence for an object moving along a Z-axis (parallel with C-B) in a specific scenario. Due to increasing distance from the camera's focal plane, the object's colour will change. The focal plane representation of the object will then have colour parameters which express the object's distance from a reference plane (e.g. first image in the sequence, 5') to the last image in the sequence 11', and recording of the object's movement between the different focal planes (the actual image sequence 5'–11' in FIG. 1), thereby obtaining an expression of the object's distance from the reference plane 5'. Known location of the focal plane, i.e. known distance values for the object combined with measured colour parameters for the object in each focal plane 5'–11' thereby give a reference scale which can be used to create a geometrical measuring scale (distance scale) for measured colour parameters, as illustrated in FIG. 2.

Figure 2:
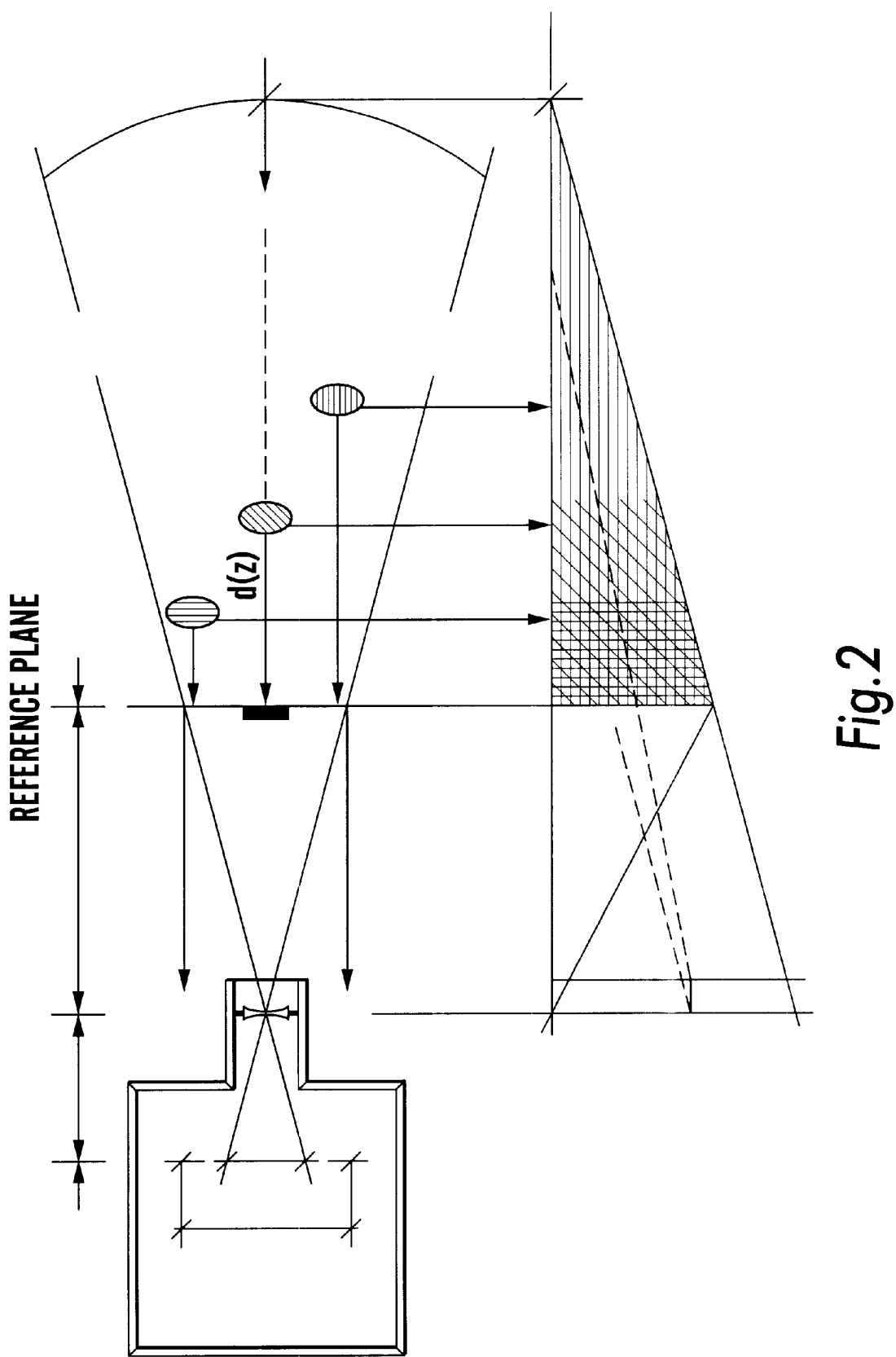
FIG. 2 illustrates the location of the different objects represented in the image relative to the reference plane.

FIG. 2 illustrates a camera with a lens and how the reference plane (the camera's focal plane) is determined. The figure also illustrates different objects which in reality are located at a specific distance d(z) from the reference plane. In the method according to the invention the object's actual spatial position is obtained on the basis of the colour parameters of the elements which represent the object in the image. At the bottom of the figure the geometrical scale can be seen which in an embodiment of the invention permits the distance between an object and the reference plane to be established on the basis of the image of the object.

Figure 3:
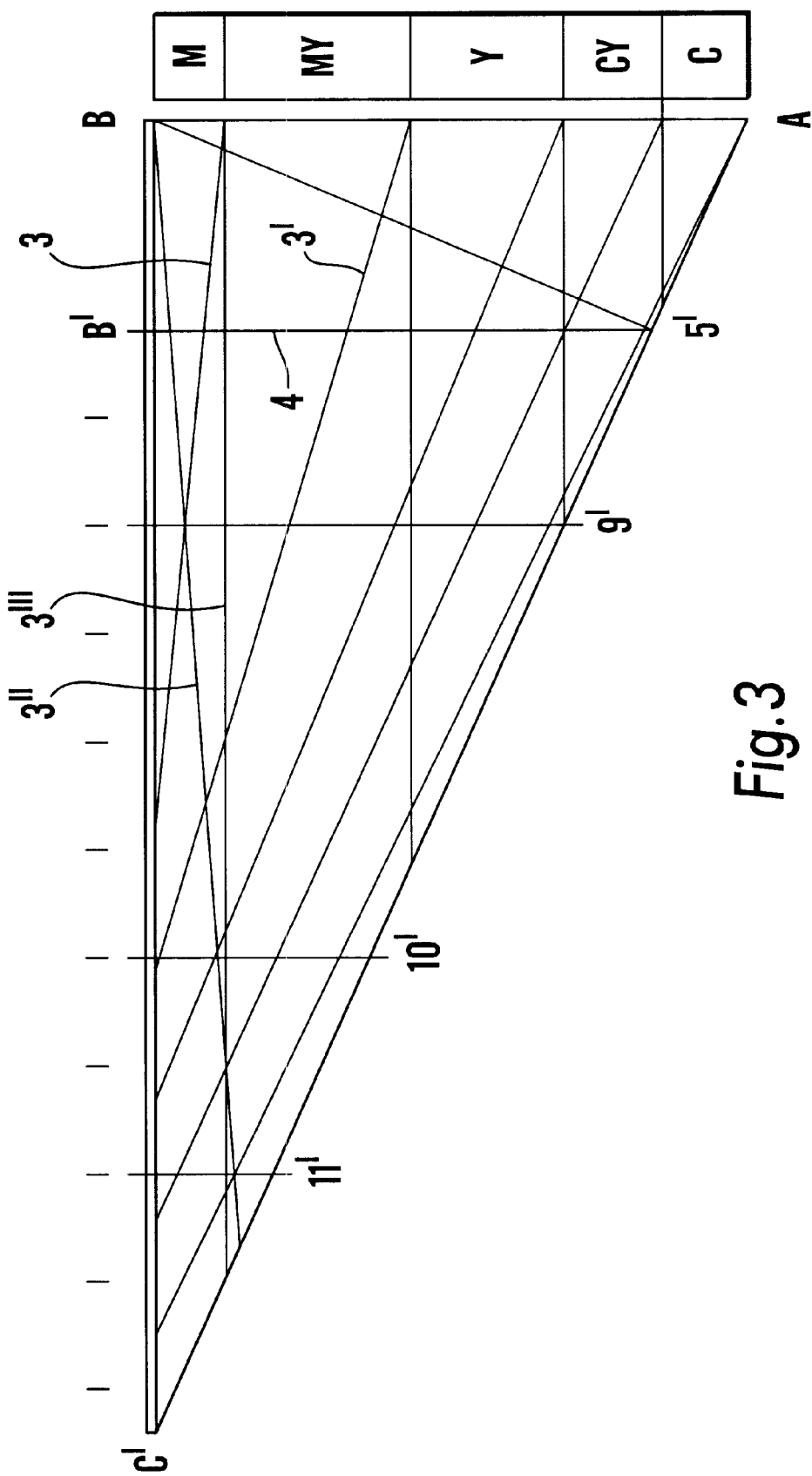
FIG. 3 illustrates the use of the data in a geometrical measuring scale.

FIG. 3 illustrates a geometrical measuring scale with geometrically coincident non-linear scales for hue, colour saturation and brightness respectively. The geometrical measuring scale will be the tool for analysing arbitrary elements in the same scenario. The measuring scale is in the form of a right-angled triangle ABC', which describes the depth range in the image scenario, corresponding to FIG. 1. Along the lateral edges there are established scales for the characteristics concerned for colour based on reference and empirical data. This geometrical measuring scale, which can be found in the frontal perspective illustrated in FIG. 4, is the principal tool in this embodiment of the method according to the invention.

Figure 4:
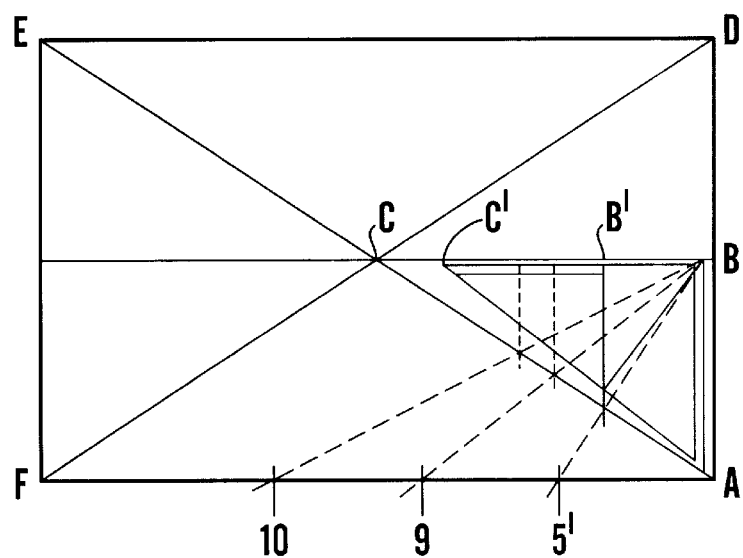
FIG. 4 is a frontal perspective representing the image format.

FIG. 4 shows a rectangle ADEF illustrating the film/video image's format. Point C in FIG. 4 describes the centre points in each focal plane, called the focal points, viewed frontally through the respective images in towards the centre of the scenario illustrated in FIG. 1, and the geometrical scale in FIG. 3 is indicated inserted in the lower right-hand quadrant. FIG. 4 is adapted to the metric system according to a scale which is calculated on the basis of a known procedure. Metric values will then be stored in its entire surface and contour.

FIG. 4 is called a frontal perspective and is known in architectural procedures in the case of manual designs for performing an exact calculation from outside and into a perspective. In the present embodiment of the invention this can be employed in reverse order, by means of automatic reading of FIG. 3 internally in FIG. 4 in an inside out perspective (FIG. 3 is thereby also adapted to the metric scale) in order to obtain exact metric distance data concerning the subject element (objects) of images.

The method according to the embodiment starts with a procedure for establishing and calibrating the tool which is employed, described above with reference to FIGS. 1, 2, 3 and 4. Firstly, the geometrical measuring scale in FIG. 3 is established with the different scales. FIG. 3 is established in its geometrical form as a right-angled triangle with corners A, B and C. Along the lateral edges there are established different scales which are responsible for the concept of the invention, viz. analysis of the colour in a photographed scenario. The geometrical scale is inserted in FIG. 4 and the scales are calibrated by means of measured data. This must be carried out for each scenario which has to be processed.

Procedures for providing perspective-distanced parameters can then be performed, for example for providing metric distance values to objects/elements in the scenario. Along the hypotenuse AC' in ABC' in FIG. 3 the order of the images in the film sequence is marked. Each image's focal plane also follows implicitly by means of vertical construction lines up to leg BC'. In the intermediate area (inside the triangle shown in FIG. 3) the colour of the individual image will be reflected.

Along leg AB in ABC' in FIG. 3 a scale is established with a distribution of hues, for example indicated in RGB format. The scale is non-linear and analytically produced with a bias of certain colours based on reference data, the warmest and frontal colours being placed at point B, and the remaining colours in RGB order with the cool and more distant colours down towards point A. All these colours along line AB belong to the saturated segment of the colours, corresponding to the lowest values of colour temperature in the scenario's perspective. During processing the distribution of the different colours will provide deviation in relation to the initial reference data, and by taking care of such empirical data the probability increases of achieving exact calibration of the scale for various scenarios.

Along leg BC' in ABC' in FIG. 3 three scales are established, in which:

scale 1 is non-linear and illustrates hue in Kelvin (K), lowest at B and rising towards C', scale 2 is non-linear and illustrates the degree of colour saturation as a percentage (%), highest at B and falling towards C', and scale 3 is non-linear and illustrates brightness.

Scale 3 will have its starting point in a point B' on line BC. Point B' is normally provided by drawing a perpendicular line from corner B down to line AC', thereby forming the point of intersection 5'. A perpendicular line is then normally drawn from point 5' up to line BC', thereby forming point B'.

The vertical 4 in FIG. 3 thus marks the closest focal plane, designated 5' in FIG. 1.

After having established in FIG. 3 scales containing initial reference data, the entire geometrical scale is inserted in FIG. 4 as indicated, either in the lower right-hand or the lower left-hand quadrant. FIG. 4, with FIG. 3's geometrical scale inserted, is laid on top of images in a scenario. The geometrical scale's extent is calibrated for the scenario in question according to measured data.

Scale 1, the hue scale, provides a guideline for the further treatment. It is non-linear and produced with a bias of certain colours based on reference data, cf. the RGB scale along leg AB. Scale 1 is calibrated at the end point, and also by means of empirical data if this is available.

Scale 1 will have its end point in an apparently coincident point C' with scales 2 and 3. At point C', called the point of convergence, measurable contrast and colour saturation will converge towards 0%. Correspondingly, point C' on scale 1 will be the highest possible measurable colour temperature in the scenario. The point of convergence C' is provided by marking these measured values on the three scales concerned from the last recorded focal plane/point in the image series and selecting an average, or alternatively measured values are employed from the most remote element/object recorded in the scenario. If empirical data indicate otherwise, an algorithm may be selected for a weighed mean which gives the end point C'.

Scale 1 for hue is a transfer (depiction) of the figure's saturated colour scale along line AB with regard to colour saturation and brightness. This implies that the area inside the triangular scale reflects the perspective change for all colours in the scenario. Thus each element in each image in the scenario is represented by its hue, saturation and brightness. The point's orientation in space related to the camera's location is unambiguously defined, and by means of adequate processing exact spatial co-ordinates (x,y,z) can be deduced.

After having established the tool in the form of a calibrated geometrical scale (FIG. 3) inserted in a frontal perspective (FIG. 4) as described above, the actual processing of the images in a scenario follows, i.e. procedures for providing perspective-distanced parameters. The tool is placed over the individual images in the scenario, and the desired parameters are obtained by known procedures.

If the metric distance to objects or elements in the images is required, the following procedure may be performed:

Desired points in the image surface incidental to the object/element are transferred via construction lines to the main perspective line AC. Perpendicular lines are normally drawn from these points on line AC up to line BC' to a point of intersection, cf. focal planes/points 11', 10' and 9' in FIG. 3. From the point of intersection with the main perspective line AC a line is also drawn up to distance point B as well as on down in its extension to a point of intersection with lateral edge AF, or in its extension outside ADEF. The metric distance to the point in the image surface from the camera will then be proportional to the distance from point A depending on the scale (or proportional to the distance from point F if the template is inserted in the lower left-hand quadrant in FIG. 4).

If metric height is required incidental to or between objects and elements in the images, a similar procedure may be performed by drawing construction lines up to line CD and then in line from the point of intersection with CD out to line AD where metric values are read off.

If metric height is required corresponding to the object or between the object and elements in the images for determination of contour, a similar known procedure may be performed.

Such metric parameters can be employed in object diagnostics by first determining spatial co-ordinates (x,y,z), i.e. converting from two-dimensional representation to three-dimensional representation for the entire or parts of the image scenario, and subsequently performing a form element analysis with regard to alteration in circumference, contour, colours, etc.

If the colour of an object/element relative to a known metric distance is required, the above procedure can be performed in reverse order. Such perspective-distanced colour parameters can be employed to create an exaggerated perspective and to manipulate two-dimensional image material so that it appears to be three-dimensional, and can be viewed by means of known video data technology, for example on high-resolution screens (Virtual 3D TV).

By means of a combination of the above and other possible embodiments of the method according to the invention, data can be deduced which can be used in production of real three-dimensional television (Real 3D TV), for viewing on a medium suited thereto.

What is claimed is:

1. A method for image processing, especially for converting a two-dimensional image of a three-dimensional real subject into a three-dimensional representation of the same three-dimensional real subject, wherein the subject is composed of elements in the two-dimensional image, and wherein the two-dimensional image is provided by means of a camera, characterized by:

defining a reference plane corresponding to the camera's focal plane lying closest to the camera's focal plane, the reference plane comprising elements corresponding to elements in the two-dimensional image, defining colour parameters hue, saturation, brightness for each element in the reference plane, creating a reference scale by determining values of the colour parameters by means of an image sequence of individual images, each of which depicts the subject in different predetermined focal planes, the changes in colour parameters between the respective focal planes being used for calibration of a geometric measuring scale which refers respective measured colour parameters to metric or perspective distance values, measuring and registering colour parameters hue, saturation and brightness for each element in the two-dimensional image, comparing colour parameters for each element in the two-dimensional picture with colour parameters for the corresponding element in the reference plane, based on said comparison, assigning to each element in the two-dimensional image a distance value dh;ds;db, where dh results from comparing hue values, ds results from comparing saturation values and db results from comparing brightness values, calculating the distance d(z) between the elements in the two-dimensional image and the reference plane, d(z) being the distance measured along a z-axis perpendicular to the reference plane and with origin therein, as a weighed average of the distance values dh,ds,db; $d(z)= \frac{1}{3}*(kh*dh+ks*ds+kb*db)$, where kh, ks and kb constitute weight factors based on empirical data, performing the transformations $d(x) \rightarrow X$, $d(y) \rightarrow Y$ and $d(z) \rightarrow Z$, where X,Y,Z are the element's co-ordinates in a three-dimensional co-ordinate system with origin in the reference plane, the transformations $d(x) \rightarrow X$, $d(y) \rightarrow Y$ being obtained by means of a known procedure for converting image elements in the plane into elements in space by means of calculated ratios (scale) between the camera's image plane and the focal planes in the space, the closest plane constituting the reference plane, and the transformation $d(z) \rightarrow Z$ being obtained by reverse application of the procedure for frontal perspective construction for reading metric distance from a standardised perspective drawing, and determining on the basis of the established distance value d(z) and the element's x,y co-ordinates in the two-dimensional image plane real spatial co-ordinates X,Y,Z for the element.

2. A method according to claim 1, characterized in that the empirical data are organised in a geometrical colour model suitable for use in connection with frontal perspective construction.

3. A method according to claim 2, characterized in that the geometrical colour model's measuring scale comprises geometrically coincident non-linear scales based on reference and empirical data for hue, colour saturation and brightness respectively, where the colour temperature increases towards its maximum value at the common end point, or point of convergence, where the colour saturation and the contrast approach zero.

4. A method according to claim 3, characterized in that the non-linear scales' common point of convergence is determined by means of the colour parameters for one or more remotely located elements in the image which was focused on the focal plane for furthest distance, the measured values for this element or average measured values for these elements determining the point of convergence.

5. A method according to claim 4, characterized in that the geometrical measuring scale is inserted in a frontal perspective diagram which corresponds to the format of the two-dimensional image and with the non-linear scales calibrated for the subject of the image concerned for determination of the distance between the reference plane and an element in the image.

6. A method according to claim 5, characterized in that a perspective-based distance value is employed.

7. A method according to claim 6, characterized in that a metric distance value is employed.

* * * * *